3,557,117
TETRAHYDRO - 4 - QUINAZOLINONES SUBSTITUTED IN THE 3-POSITION BY HETEROCYCLIC GROUP
Bola Vithal Shetty, Rochester, N.Y., assignor to Pennwalt Corporation, a corporation of Pennsylvania
No Drawing. Filed Dec. 24, 1968, Ser. No. 793,638
Int. Cl. C07d 51/48
U.S. Cl. 260—256.5                7 Claims

ABSTRACT OF THE DISCLOSURE

A 3-heterocyclic-6-sulfamyl-7-halo (including 7-trifluoromethyl)-1,2,3,4 - tetrahydro-4-quinazolinone having diuretic characteristics is made by reduction of the corresponding unsaturated compound or by cyclizing the anthranilamide. A typical compound is 2-methyl-3-(2-pyridyl)-6-sulfamyl-7-chloro-1,2,3,4-tetrahydro - 4 - quinazolinone.

---

The invention relates to tetrahydro-4-quinazolinone compounds substituted in the 3-position by a heterocyclic group, useful as diuretics and saluretics.

Applicant has discovered that the substitution of a heterocyclic group for the 3-aryl group of the compounds disclosed in his Pat. 3,360,518, which is hereby incorporated by reference, give compounds which, like those of the patent, are diuretics and saluretics which may be administered to warm blooded animals in a manner and amount like the compounds of the patent.

The suitable heterocyclic group in the 3-position of the quinazolinone include pyridyl, substituted pyridyl, piperidyl, substituted piperidyl, piperazinyl, substituted piperazinyl, pyrimidyl, substituted pyrimidyl, thiazolyl, substituted thiazolyl, benzothiazolyl, substituted benzothiazolyl, pyrrolidinyl, substituted pyrrolidinyl, pyrazinyl, substituted pyrazinyl, quinolyl, substituted quinolyl, quinuclidinyl, morpholinyl, triazolyl, benzimidazolyl, substituted benzimidazolyl, pyridazinyl, substituted pyridazinyl, pyrazolinyl, substituted pyrazolinyl.

Compounds containing other substituents in the 1- and 2-position, and on the sulfamyl group, are also diuretics as shown in the general formula below:

General Formula

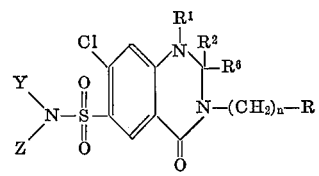

Y and Z=hydrogen, or lower alkyl
$R^1$=hydrogen, alkyl, aralkyl
$R^2$, $R^6$=hydrogen, substituted or unsubstituted alkyl, aryl, substituted aryl, aralkyl, alicyclic, or spirocyclic
$n$=integer from 0 to 6
R=pyridyl, substituted pyridyl, piperidyl, substituted piperidyl, piperazinyl, substituted piperazinyl, pyrimidyl, substituted pyrimidyl, thiazolyl, substituted thiazolyl, benzothiazolyl, substituted benzothiazolyl, pyrrolidinyl, substituted pyrrolidinyl, pyrazinyl, substituted pyrazinyl, quinolyl, substituted quinolyl, quinuclidinyl, morpholinyl, triazolyl, benzimidazolyl, substituted benzimidazolyl, pyridazinyl, substituted pyridazinyl, pyrazolinyl, substituted pyrazolinyl The substituent in the heterocyclic group is preferably a lower alkyl such as methyl, ethyl or propyl, but the other substituents of the phenyl group shown in my Pat. 3,360,518 may be present in the heterocyclic member, such substituents for any of the hydrogens of the heterocyclic ring being lower alkyl, hydroxy, lower alkoxy, amino, sulfamyl, halogen or trifluoromethyl. Particularly satisfactory diuretics have been obtained when the 3-heterocyclic group is pyridyl or pyridyl in which a lower alkyl has been substituted for a hydrogen.

$R^1$ is preferably hydrogen, lower alkyl (1–8 carbon atoms), or a phenyl lower alkyl.

$R^2$ is preferably hydrogen, lower alkyl, halogen, substituted lower alkyl, thio lower alkyl, lower cyclo alkyl, lower cyclo alkyl lower alkyl, phenyl, phenyl alkyl.

$R^6$ is preferably hydrogen but may be the same as $R^2$ and may form with $R^2$ a spirocyclic group.

$n$ is an integer from 0–6, but is preferably zero.

Referring to the compounds in columns 2, 3, and 7 of my Pat. 3,360,518, suitable specific compounds are those in which the 3-aryl group such as 3-o-tolyl has been replaced by a 3-(2-pyridyl) or a 3-(2-pyridyl) substituted as shown for the phenyl ring of the compounds. Instead of 2-pyridyl the N- may be in the other positions of the ring.

The following additional examples of compounds coming within this invention are given below:

ADDITIONAL EXAMPLES

| Y | Z | $R^1$ | $R^2$ | $R^6$ | n | R |
|---|---|---|---|---|---|---|
| H | H | H | $CH_3$ | H | 0 | pyridyl |
| H | H | H | H | H | 0 | Same. |
| H | H | $CH_3$ | H | H | 0 | Do. |
| H | H | H | $CH_3$ | H | 0 | methylpyridyl |
| H | H | H | $CH_3$ | H | 0 | pyridyl |
| H | H | H | $CH_3$ | H | 0 | Same. |
| H | H | H | $CH_3$ | H | 0 | thiazolyl |

ADDITIONAL EXAMPLES—Continued
| Y | Z | R¹ | R² | R⁶ | n | R |
|---|---|----|----|----|----|---|
| H | H | H | CH₃ | H | 0 | 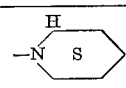 |
| H | H | H | CH₃ | H | 0 | 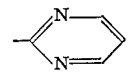 |
| H | H | H | CH₃ | H | 0 | 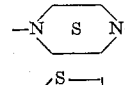 |
| H | H | H | CH₃ | H | 0 | 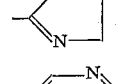 |
| H | H | H | CH₃ | H | 0 | 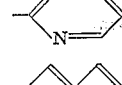 |
| H | H | H | CH₃ | H | 0 | 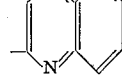 |
| H | H | H | CH₃ | H | 0 |  |
| H | H | H | CH₃ | H | 2 | 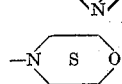 |
| H | H | H | CH₃ | H | 2 | 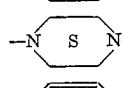 |
| H | H | H | CH₃ | H | 2 | 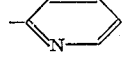 |
| H | H | H | CH₃ | H | 2 | 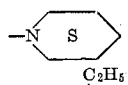 |
| H | H | H | CH₃ | H | 0 | 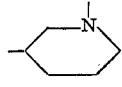 |
| H | H | H | CH₃ | H | 1 | 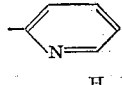 |
| H | H | H | CH₃ | H | 0 | 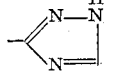 |
| H | H | H | CH₃ | H | 0 | 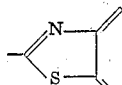 |
| H | H | H | CH₃ | H | 0 | 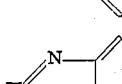 |
| H | H | H | CH₃ | H | 0 | 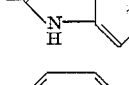 |
| H | H | H | CH₃ | H | 0 | 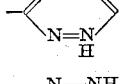 |
| H | H | H | CH₃ | H | 0 | 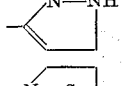 |
| H | H | H | CH₃ | H | 0 | 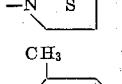 |
| H | H | H | CH₃ | H | 0 | 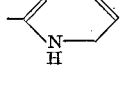 |

ADDITIONAL EXAMPLES—Continued

| Y | Y | R¹ | R² | R⁹ | n | R |
|---|---|---|---|---|---|---|
| H | H | H | $C_2H_5$ | H | 0 | -pyridyl |
| H | H | H | n-$C_3H_7$ | H | 0 | Same. |
| H | H | H | n-$C_4H_9$ | H | 0 | Do. |
| H | H | H | -phenyl | H | 0 | Do. |
| H | H | H | $-CH_2SCH_2-CF_3$ | H | 0 | Do. |
| H | H | H | $-CH_2Cl$ | H | 0 | Do. |
| H | H | H | $-CHCl_2$ | H | 0 | Do. |
| H | H | H | $-CH_2-$phenyl | H | 0 | Do. |
| H | H | H | $-CH_2-$cyclopentyl | H | 0 | Do. |
| H | H | H | -cyclobutyl | H | 0 | Do. |
| H | H | H | $-(CH_2)_5-$ | | 0 | Do. |
| H | H | H | $CH_3$ | $CH_3$ | 0 | Do. |
| H | H | $-CH_2-$phenyl | $CH_3$ | H | 0 | Do. |
| H | H | H | $-CH_2CH=CH_3$ | H | 0 | Do. |
| H | H | H | $(CH_3)_2CH-$ | H | 0 | Do. |
| H | H | H | $-(CH_2)_2\overset{CH_3}{N}-(CH_2)_2-$ | | 0 | Do. |
| H | H | H | $-CH_2OCH_3$ | H | 0 | Do. |
| H | H | $CH_3$ | $CH_3$ | H | 0 | Do. |
| $CH_3$ | H | H | $CH_3$ | H | 0 | Do. |
| $CH_3$ | $CH_3$ | H | $CH_3$ | H | 0 | Do. |
| H | H | H | $-O-$ | | 0 | Do. |
| H | H | H | $CH_3$ | H | 0 | -N\S (thiazine) |

EXAMPLE 1

Preparation of 2-methyl-3-(2-pyridyl)-6-sulfamyl-7-chloro-1,2,3,4-tetrahydro-4-quinazolinone (762–363)

Synthetic route:

I $\xrightarrow{(CH_3CO)_2O}$

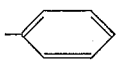

II $\xrightarrow{\text{1. ClSO}_3H \\ \text{2. NH}_3}$

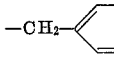

III $\xrightarrow{[O] \\ (KMnO_4)}$

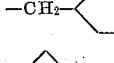

IV $\xrightarrow{OH^\ominus \\ \Delta}$

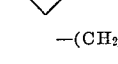

V $\xrightarrow{COCl_2 \\ HOAc}$

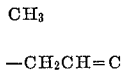

VI $\xrightarrow{H_2N-\text{pyridyl}}{\Delta}$

VII $\xrightarrow{CH_3CH(OCH_3)_2 \\ H_2SO_4/HOAc}$

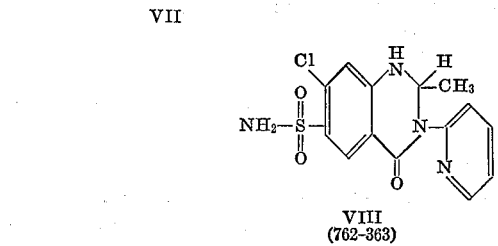

VIII
(762-363)

Preparation of 5-chloro-2-methyl acetanilide (II)

To a well stirred mixture of 6000 gm. (42.4 m.) of 5-chloro-o-toluidine in 30 liters of water at 35° C., was added all at once 8800 gm. (84.8 m.) of acetic anhydride. Almost immediately the mixture became a solution and then began thickening as the temperature rose to 75–80° C.

The reaction mixture was stirred to room temperature and the solid was filtered and carefully washed with water to yield 7900 gm. (100%) of product, melting at 138–141° C.

Preparation of 5-chloro-2-methyl-4-sulfamyl acetanilide (III)

Twelve hundred grams (6.55 m.) of the above product was added slowly to 3823 gm. (32.8 m.) of chlorosulfonic acid at or below 20° C. The ice bath was removed and 352 gm. (6.0 m.) of sodium chloride was slowly added. The solution was heated very slowly to 92° C. (vigorous foaming from 75–90° C.) with good stirring and kept there for one hour.

The hot, thick solution was poured over a mixture of 10 liters of acetone and ice, with ice being added to keep the mixture at or near 0° C. The white solid was filtered and washed with water.

The solid was put into 7.5 l. of concentrated $NH_4OH$ and the mixture was stirred and heated to 50° C. and then allowed to cool to room temperature. The solid was filtered and dissolved in 8 liters of water and 520 ml. of 50% NaOH at room temperature. The insolubles were filtered off, and the filtrate was made pH 1–2 with concentrated HCl with cooling, and the solid filtered and carefully water washed to yield 888 gm. (52%) of white solid, melting at 267.5–270° C.

Preparation of N-acetyl-4-chloro-5-sulfamyl anthranilic acid (IV)

Into 50 liters of water was put 7150 gm. of $MgSO_4 \cdot 7H_2O$ and 2505 gm. (9.55 m.) of the above acetanilide, and the mixture was heated to 85° C. Forty-four hundred thirty-eight grams (28 m.) $KMnO_4$ were added portionwise, keeping the internal temperature at 80–85° C. After the addition, the temperature was kept at 85° until the violet color of the solution had disappeared.

The mixture was filtered, and the filtrate made pH 1 with concentrated HCl, cooled to 5° C. and filtered to yield 1775 gm. (64%), melting at 271–273° C.

Preparation of 4-chloro-5-sulfamyl anthranilic acid (V)

The acetanilide, 835 gm. (2.86 m.) was dissolved in 7.5 liters of 3N NaOH and refluxed with stirring for 3 hours. It was then made pH 1–2 with concentrated HCl, yielding a white solid, which was filtered and carefully water washed to yield 639 gm. (89%) of product, melting at 272–274° C.

Preparation of 6-chloro-7-sulfamylisatoic anhydride (VI)

Six hundred thirteen grams (2.45 m.) of the anthranilic acid was suspended in 8.5 liters of glacial acetic acid at room temperature. To this was added 850 gm. (8.6 m.) of phosgene liquid all at once with no noticeable heat of reaction. The reaction was allowed to stir for 3½ hours.

The solid was filtered carefully, washed with ether, and dried over $P_2O_5$ in a vacuum desiccator to yield 676 gm. (100%) of white solid, melting at 294–295° C. (decomp.).

Preparation of 2-amino-4-chloro-5-sulfamyl-N-(2-pyridyl)-benzamide (VII)

To 50 gm. of molten 2-aminopyridine was added 8.5 gm. 6-chloro-7-sulfamylisatoic anhydride. The mixture was heated to 160° and the temperature maintained for 5 minutes. The solution was then allowed to cool. At 40° 100 ml. water was added and the mixture stirred at room temperature for two hours. The product was filtered, washed with water, and recrystallized from DMF-water; yield 2.9 gm. melting at 208–210°.

Preparation of 2-methyl-3-(2-pyridyl)-6-sulfamyl-7-chloro-1,2,3,4-tetrahydro-4-quinazolinone (762–363 VIII)

To 10.55 gm. of 2-amino-4-chloro-5-sulfamyl-N-(2-pyridyl)-benzamide was added 170 ml. glacial acetic acid and 5.46 gm. 1,1-dimethoxyethane. While stirring the mixture 50 drops of concentrated sulfuric acid were added slowly to avoid gumming. The mixture was then stirred overnight at room temperature. The acetic acid was removed under reduced pressure and the residue triturated with 200 ml. water and then enough saturated sodium bicarbonate solution added to obtain a pH of 7 to 8. The product was filtered, washed with water and dried. Yield 10.5 gm. Recrystallization from 95% ethanol yielded 8.5 gm., melting at 240–243° (dec). A second recrystallization yielded an analytically pure compound, melting at 243–246° (dec).

*Analysis.*—Calcd. for $C_{14}H_{13}ClN_4O_3S$ (percent): C, 47.66; H, 3.71; Cl, 10.05; N, 15.88; H, 9.09. Found (percent): C, 47.73; H, 3.72; Cl, 10.17; N, 15.91; S, 9.16.

EXAMPLE 2

Preparation of 2-methyl-3-(2-pyridyl-6-sulfamyl-7-chloro-1,2,3,4-tetrahydro-4-quinazolinone Synthetic Route:

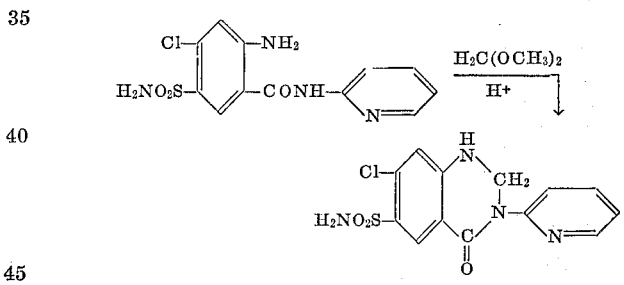

To 4.09 gm. 2-amino-4-chloro-5-sulfamyl-N-(2-pyridyl)-benzamide dissolved in 25 ml. DMF was added 8 ml. 2.5 N hydrochloric acid. A precipitate formed and the mixture tested acid. To this was added 2.5 ml. dimethoxymethane and the mixture heated to 75° with stirring. When this temperature was reached (required 15 minutes) another 2.0 ml. dimethoxymethane was added and the heating and stirring continued. After an additional one-half hour heating at 75–85° a clear solution was obtained and the reaction was complete. The cooled reaction mixture was slowly poured, with stirring, into 125 ml. water. After one hour the crude product was filtered and washed with water; yield 3.7 gm.

The other compounds of this invention may be made by modifications well within the skill of the art. Likewise, therapeutically effective salts of the compounds of the invention may be made by methods known to the art, and are useful diuretics. For example, the sulfamyl group will react with bases to give sodium, potassium or ammonium salts of the quinazolinone compound. The basic nitrogen of the quinazolinone can be reacted with acids such as hydrochloric, maleic, tartaric, and the acidic ion exchange resins such as carboxylic acid, phosphonic acid, and sulfonic acid cation exchange resins to give the therapeutically effective and nontoxic salts of the quinazolinone compound.

The compounds of this invention have good potassium retention as well as inducing diuresis.

What I claim is:
1. A compound of the formula:

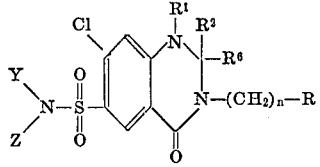

or any of the pharmaceutically effective salts thereof, in which:

Y is hydrogen or lower alkyl;
Z is any of the members of Y;
$R^1$ is hydrogen, lower alkyl, or phenyl lower alkyl;
$R^2$ is hydrogen, lower alkyl, halogen, halogen substituted lower alkyl, thio lower alkyl, lower cycloalkyl, lower cycloalkyl lower alkyl, phenyl, or phenyl lower alkyl;
$R^6$ is any of $R^2$ or with $R^2$ forms a lower cycloalkyl or pyrrolidinyl group;
R is pyridyl, piperidyl, piperazinyl, pyrimidyl, thiazolyl, benzothiazolyl, pyrrolidinyl, pyrazinyl, quinolyl, quinuclidinyl, morpholinyl, triazolyl, benzimidazolyl, pyridazinyl, pyrazolinyl, any of the hydrogens of said groups being optionally substituted by lower alkyl, hydroxy, lower alkoxy, amino sulfamyl, halogen or trifluoromethyl.

2. A compound according to claim 1 in which n is zero.

3. A compound according to claim 1 in which $R^2$ is hydrogen or lower alkyl; $R^1$ is hydrogen or lower alkyl; $R^6$ is hydrogen, and R is pyridyl or lower alkyl substituted pyridyl.

4. A compound according to claim 3 which is 2-methyl-3-(2-pyridyl)-6-sulfamyl-7-chloro - 1,2,3,4 - tetrahydro-4-quinazolinone.

5. A compound according to claim 3 which is 3-(2-pyridyl) - 6 - sulfamyl - 7 - chloro - 1,2,3,4 - tetrahydro-4-quinazolinone.

6. The compound according to claim 3 which is 2-methyl - 3 - (3 - methyl - 2 - pyridyl) - 6 - sulfamyl - 7-chloro-1,2,3,4-tetrahydro-4-quinazolinone.

7. The compound according to claim 3 which is 2-methyl - 3 - (6 - methyl - 2 - pyridyl) - 6 - sulfamyl - 7-chloro-1,2,3,4-tetrahydro-4-quinazolinone.

References Cited

UNITED STATES PATENTS 3,452,020    6/1969    Shetty _____ 260—256.5

ALEX MAZEL, Primary Examiner

R. J. GALLAGHER, Assistant Examiner

U.S. Cl. X.R.

260—239.7, 239.75, 239.8, 239.9, 239.95, 247.1, 999.

UNITED STATES PATENT OFFICE
CERTIFICATE OF CORRECTION

Patent No. 3,557,117                Dated January 19, 1971

Inventor(s) Bola Vithal Shetty

It is certified that error appears in the above-identified patent and that said Letters Patent are hereby corrected as shown below:

Column 9, Claim 1, line 20, after "pyrrolidinyl group;"

insert ---n is an integer from 0 to 6;---;

penultimate line of claim, after

"amino" insert a comma.

Signed and sealed this 18th day of May 1971.

(SEAL)
Attest:

EDWARD M. FLETCHER, JR.          WILLIAM E. SCHUYLER, JR.
Attesting Officer                Commissioner of Patents